UNITED STATES PATENT OFFICE.

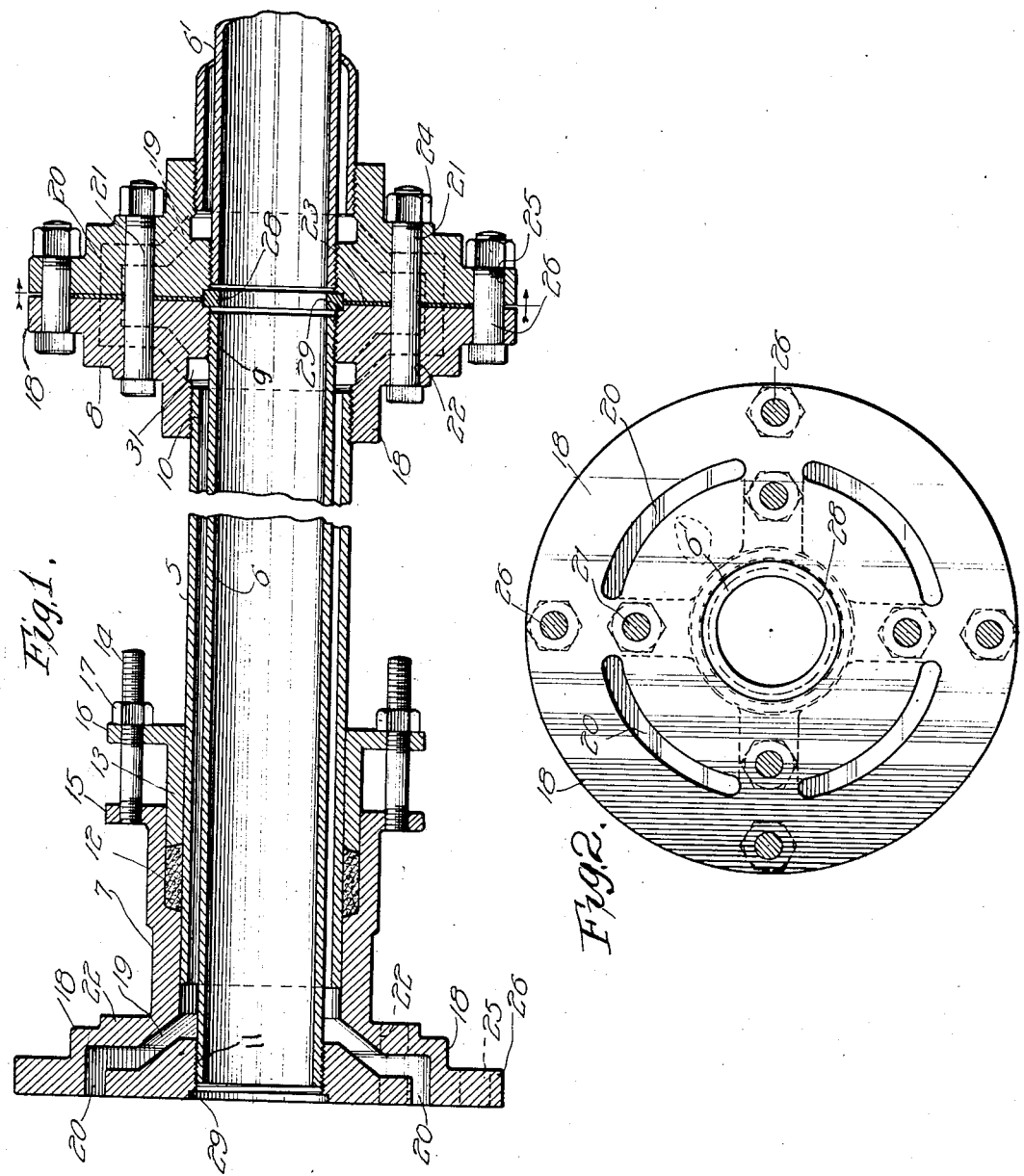

OWEN D. McFARLAND, OF CHICAGO, ILLINOIS, ASSIGNOR TO GUYTON AND CUMFER MANUFACTURING COMPANY, OF CHICAGO, ILLINOIS, A CORPORATION OF ILLINOIS.

FLANGED COUPLING FOR DOUBLE-PIPE CONDUITS.

1,389,768.  Specification of Letters Patent.  Patented Sept. 6, 1921.

Application filed May 9, 1919. Serial No. 295,823.

*To all whom it may concern:*

Be it known that I, OWEN D. McFARLAND, a citizen of the United States, residing at Chicago, in the county of Cook and State of Illinois, have invented certain new and useful Improvements in Flanged Couplings for Double-Pipe Conduits, of which the following is a specification.

The invention relates to improvements in flanged couplings for double pipe conduits.

One of the objects of the invention is to provide an improved flange coupling, for double pipe conduits, wherein a series of securing bolts are placed nearer to the axis of the structure and in which another circumferentially extending set of bolts is placed on the outside of the high pressure conduit opening, there being a series of bolts between the openings through the confronting flanges of the coupling.

A further object of the invention is to provide a batten ring to bridge the joint between the flanges for reinforcing the holding effect of the gasket.

Other, further and more specific objects of the invention will become readily apparent, to persons skilled in the art, from a consideration of the following description when taken in conjunction with the drawings, wherein:—

Figure 1 is a central longitudinal section through a double pipe conduit and connecting flanges.

Fig. 2 is an end view of one of the improved flanges.

In both views the same reference characters are employed to indicate similar parts.

Each section, of the double pipe conduit, comprises pipes 5 and 6, the pipe 6 constituting one conduit and the space between the pipes 5 and 6, constituting a jacket or the other conduit. Conduits of this character are frequently used for conveying a rather viscous liquid, through the center pipe, heated to a temperature above normal, by steam, or other similar heating medium passing through the jacket or space between the pipes, to render the fluid less viscous and more mobile for the purpose of transmitting it, from point to point, through a conduit of this character.

On account of the unequal expansion and contraction of the pipes, a slip joint expansion coupling 7 is used in the embodiment of my invention at one end of each pipe section, while a more simple coupling structure, such as that indicated by 8, may be used at the other end of each section. The coupling member 8, consists of one integral part having two longitudinally extending openings, in one of which the inner pipe is screw threaded, as at 9, and the outer pipe is screw threaded into the relatively larger opening, as at 10. In the slip joint expansion coupling at the other end of the section, the inner pipe is screw threaded into the flange member, as at 11, while the outer pipe is free to move longitudinally within the expansion coupling, there being in said coupling a space between the member 7 and the outer pipe, within which to contain packing 12, which is held in place by a gland 13, surrounding the outer pipe 5 and adjustable within the opening by means of studs 14 that pass through and are fixed to the flange member 15, and which pass loosely through the flange member 16 of the gland, being adjustable by the nuts 17.

In each of the coupling members 7 and 8, there is a flange 18 having an opening 19 that is a continuation of the opening between the pipes 5 and 6 and which, preferably, proceed in a parallel direction, and terminate in a port, as at 20, to register with a similar port or opening in a like flange of the adjacent coupling member.

A series of concentrically arranged bolt openings, to receive bolts 21, are located in the thicker part of the flange member, as at 22, and between the conduit openings 9, 10, 19 and 20. The bolts are held in the flanges, and the flanges are secured in close proximity to the gasket 23 by the nuts 24 that surround the bolts. Another series of openings 25 to receive bolts 26, are located radially beyond the series of bolts 21 and outside the conduit openings, and pass through a narrower portion of the respective flanges, and these bolts 26 supplement the holding effect of the first series mentioned. By placing the two series of concentrically arranged bolts through the flanges, the flanges are more intimately held in contact at those parts that immediately surround the ports, or openings 20, through the respective flanges, and through which the relatively high pressure fluid is caused to pass, and, furthermore, there is less danger of blowing the gasket into the inner conduit, or smaller pipe, which is to contain a commodity that is to be heated by the medium that will pass through the space between the pipes.

To reinforce the effect of the gasket I prefer to place a batten ring 28, to bridge the space within which the gasket 23 is contained, and within the space 29, which is a composite counter-bore in the face of the respective flange members. This ring fits neatly in the counter bored enlargement and abuts against the inner surface of the gasket and very effectually reinforces the resistance interposed by the gasket against the steam pressure in the outer conduit, tending to force it inwardly. The pipes 6 and 6' of the inner conduit are not permitted to enter the counter bore 29, so that sufficient space is left for the insertion of the batten ring 28 before the coupling sections are connected together, by the bolts.

The flange 18 of the coupling member located at one end of the conduit section, is similar to the flange that is a part of the expansion joint and which invariably is connected to the opposite end of the section.

The outer pipe 5 is not permitted to enter the outer opening in the flange coupling member to such an extent as to shut off the opening or port 31 that communicates with the annular space left between the pipes 5 and 6.

Having described my invention, what I claim is:—

1. A flange coupling for a double pipe conduit, providing in combinative association, two like flange coupling members, each member having a pair of longitudinally extending openings for two different size pipes; a series of concentrically arranged bolt holes between said openings, and another similar series of bolt holes, outside of the openings to receive bolts to connect adjacent coupling members together.

2. A flange coupling for a double pipe conduit, providing in combinative association, two like flange coupling members, each member having a pair of longitudinally extending openings for two different size pipes; a series of concentrically arranged bolt holes between said openings, and another similar series of bolt holes, outside of the openings to receive bolts, to connect adjacent coupling members together; a gasket, between the flange members and a batten ring in the inner conduit bridging the space containing the gasket.

In testimony whereof I hereunto subscribe my name.

OWEN D. McFARLAND